United States Patent [19]

Hibbs et al.

[11] Patent Number: 5,204,133

[45] Date of Patent: Apr. 20, 1993

[54] PROCESS FOR PREPARING SLICED POTATO PRODUCTS

[75] Inventors: Robert A. Hibbs; Wayne B. Durfey, both of Boise, Id.

[73] Assignee: Refrigerated Foods Technology, Inc., Boise, Id.

[21] Appl. No.: 823,583

[22] Filed: Jan. 16, 1992

Related U.S. Application Data

[63] Continuation-in-part of Ser. No. 691,527, Apr. 25, 1991, abandoned.

[51] Int. Cl.$^5$ ............................................. A23L 1/217
[52] U.S. Cl. ................... 426/393; 426/410; 426/419; 426/438; 426/637
[58] Field of Search ............... 426/637, 438, 410, 419, 426/509, 106, 393

[56] References Cited

U.S. PATENT DOCUMENTS

| | | | |
|---|---|---|---|
| 3,355,299 | 11/1967 | McLaughlin | 426/441 |
| 3,773,527 | 11/1973 | Ruggerone | 426/637 |
| 3,934,046 | 1/1976 | Weaver et al. | 426/637 |
| 3,968,265 | 7/1976 | Shatila et al. | 426/637 |
| 4,007,292 | 2/1977 | Shatila et al. | 426/438 |
| 4,109,012 | 8/1978 | Bates et al. | 426/637 |
| 4,269,861 | 5/1981 | Caridis et al. | 426/637 |
| 4,317,842 | 3/1982 | El-Hag et al. | 426/438 |
| 4,325,295 | 4/1982 | Caridis et al. | 426/438 |
| 4,503,127 | 3/1985 | Fan et al. | 426/438 |
| 4,525,368 | 6/1985 | Bengtsson et al. | 426/438 |
| 4,579,743 | 4/1986 | Hullah | 426/262 |
| 4,800,098 | 1/1989 | Galland | 426/637 |
| 4,957,761 | 9/1990 | Hale | 426/410 |

FOREIGN PATENT DOCUMENTS

0117002 8/1984 European Pat. Off. ............ 426/419

*Primary Examiner*—Arthur L. Corbin
*Attorney, Agent, or Firm*—Hopkins, French, Crockett, Springer & Hoopes

[57] ABSTRACT

Sliced potato products are prepared for refrigerated storage and distribution while retaining the characteristics of wholesome, freshly sliced potatoes for a minimum of 45 days. The potatoes may be peeled, or unpeeled, and cut into any sliced configuration, such as French fries, crinkle cuts, or homefries. The potato pieces are then washed, dewatered, and sterilized in a hot oil blanch. The cut potatoes are then mechanically chilled and packaged in an inert atmosphere which utilizes $CO_2$ as a component. The packaged potatoes are stored and distributed under refrigeration until ready for use.

13 Claims, 1 Drawing Sheet

PROCESS FOR PREPARING SLICED POTATO PRODUCTS

CROSS REFERENCE TO RELATED APPLICATION

This is a continuation-in-part of U.S. patent application Ser. No. 07/691,257, filed Apr. 4, 25, 1991, now abandoned.

FIELD OF THE INVENTION

This invention relates to potato processing and, more specifically, relates to a process for preparing sliced potato products that results in the preservation of the fresh-cut characteristics of the sliced potato products for a minimum of 45 days without additives or preservatives.

BACKGROUND OF THE INVENTION

Originally, commercially prepared potato products such as French fries and homefries were processed at the restaurant level. The characteristics of deep-fried potato pieces were generally considered superior to other potatoes prepared by different commercial processes. Typically, processing was minimal and the result was a finished product having a varied color, low solids, and natural flavor.

As consumer demand grew, however, the in-house process became more and more impractical. Problems associated with offal (waste products, i.e. peels, trim) disposal, uniform quality of the raw product, in-house storage space, and adequate supply forced large users to a processed frozen substitute.

The current popularity of processed frozen potato products is more the result of commercial feasibility than it is the result of preferred product quality characteristics In fact, frozen potato processors have been unsuccessful in their attempts over the years to duplicate "fresh cut" potato characteristics. One drawback with French fries from processed frozen potatoes is that the texture changes rapidly after reheating of the frozen product. Just after reheating, the product is crisp and shows good texture but, on cooling, becomes limp and soggy with a greasy taste.

In addition to frozen processors who generally distribute nationally, most major cities have local suppliers of fresh-cut potato products. These processors have thrived over the years because they offered lower cost and their products more closely resembled fresh-cut potatoes. But these processors lacked uniformity across the country, and chain restaurants were unable to use the product since they require uniform cost control and quality.

Additionally, during the past decade, certain preservatives used by local fresh suppliers have been found to be harmful to humans. In the absence of suitable preservative alternatives, these suppliers will be confronted with further debilitating problems.

Recently, there has been a renewed interest in in-house processing of whole potatoes. Restaurants that process fresh French fries advertise this fact to their consumers who have responded favorably. There is every indication that the characteristics of fresh-cut French fries are experiencing renewed preference by a growing number of today's consumers.

Certain prior art patents for potato products produced for refrigerated storage (e.g. U.S. Pat. No. 4,579,743 issued Apr. 1, 1986 by Hullah) cite the general preference for freshly prepared products. The popularity of frozen potato products, however, has been due to increased dining out frequencies and chain restaurant demands for cost control and quality uniformity.

As is well known in the art, however, the quality of frozen potato products is adversely affected by numerous processing steps that achieve high finished solids and color uniformity at the expense of potato flavor. In fact, with some prior art processes, starch and sugar have been so completely removed that the product, as consumed, takes on an and seasonings flavor more dominant than the potato flavor. Freezing also adversely affects the texture of potato pieces due to the rupturing of cells and the releasing of moisture and starch.

One alternative to frozen packaging and storage is controlled atmosphere packaging. In general, with controlled atmosphere packaging, the potatoes are washed and sliced, blanched to inactivate enzymes, cooked, and vacuum packaged under a controlled atmosphere. In general, however, due to processing and quality problems, this technology has not received widespread commercial acceptance.

A review of processes utilizing controlled atmosphere packaging, for example, U.S. Pat. No. 4,957,761 issued Sep. 18, 1990 by Hale ('761), reflects the widespread use of hot water (up to 190° F.) for prolonged periods of time (10 to 20 minutes) as a means of controlling color. This processing step adversely affects the solids content and flavor of the finished product. While the use of hot water may indeed create a white crust on the potato strip, it effectively reduces the starch and sugar to achieve this whiteness.

A water blanching step makes the outer surfaces of the potatoes even whiter and removes even more solids. The solids are leached from the potatoes into the blanching water, removing some of the natural flavor. It will also remove some nutrients and, especially, water-soluble vitamins.

It is apparent that the above cited processes, including the Hullah process, fail to achieve the flavor and texture of a fresh-made potato product. The present invention, on the other hand, is directed to a process which effectively retains the natural color and texture, i.e. lower solids, associated with fresh-cut potatoes. In addition, the manufacturing cost of the process of the invention will be reduced compared to other processes that increase solids in the potato strips.

Moreover, the product of the present invention, as packed, will contain less than half the oil normally associated with frozen fries; and, while oil uptake in finish frying must be controlled, it offers justifiable health claims.

It is thus a specific object of this invention to provide a sliced potato product with minimum processing steps which, when French fried, has the taste, texture, and color variation normally associated with fresh-cut potatoes.

It is another objective of this invention to provide a sliced potato product that can be stored for an adequate period of time between process and consumption without noticeable deterioration in color, texture, taste, or healthful characteristics, including microbiological quality.

It is an object of this invention to provide a sliced potato product having no artificial preservatives.

It is an object of this invention to eliminate the use of hot water or steam as a blanch or cooking agent which results in a reduction in natural sugar or starch.

It is an object of this invention to use an oil branch as a sterilizing process rather than as a cooking process.

It is an object of this invention to allow for some textural enhancement associated with air drying, if preferred, in specific applications of the invention. It is recognized, however, that air drying creates a higher solid content and some loss of flavor.

It is an object of this invention to minimize oil uptake in a finished, processed potato product to about 5%.

It is another object of this invention to provide consumers with a better tasting, more healthful French fry.

SUMMARY OF THE INVENTION

In accordance with the present invention, a method for preparing sliced potato products is provided. The method of the invention simply stated comprises blanching and sterilizing sliced potatoes in hot oil and then cooling and packaging the potatoes in a controlled atmosphere that includes $CO_2$ gas. The process subjects the potatoes to a minimal amount of handling so that natural texture of potatoes is maintained. Moreover, the solids content and color of the potatoes is maintained by the use of a hot oil blanch rather than a water blanch as taught by the prior art.

More specifically, the method of the invention includes the steps of:
preparing fresh potatoes by cutting, washing, and dewatering;
blanching and sterilizing the sliced potatoes in hot oil;
chilling the sliced potatoes;
packaging the sliced potatoes in a package having an inert gas atmosphere that includes $CO_2$; and
storing the package of sliced potatoes at a cool temperature until ready for use.

Potatoes processed in accordance with the invention have a shelf life of about 6 to 10 weeks.

Other objects, advantages, and capabilities of the present invention will become more apparent as the description proceeds.

DETAILED DESCRIPTION OF THE INVENTION

Figure 1:
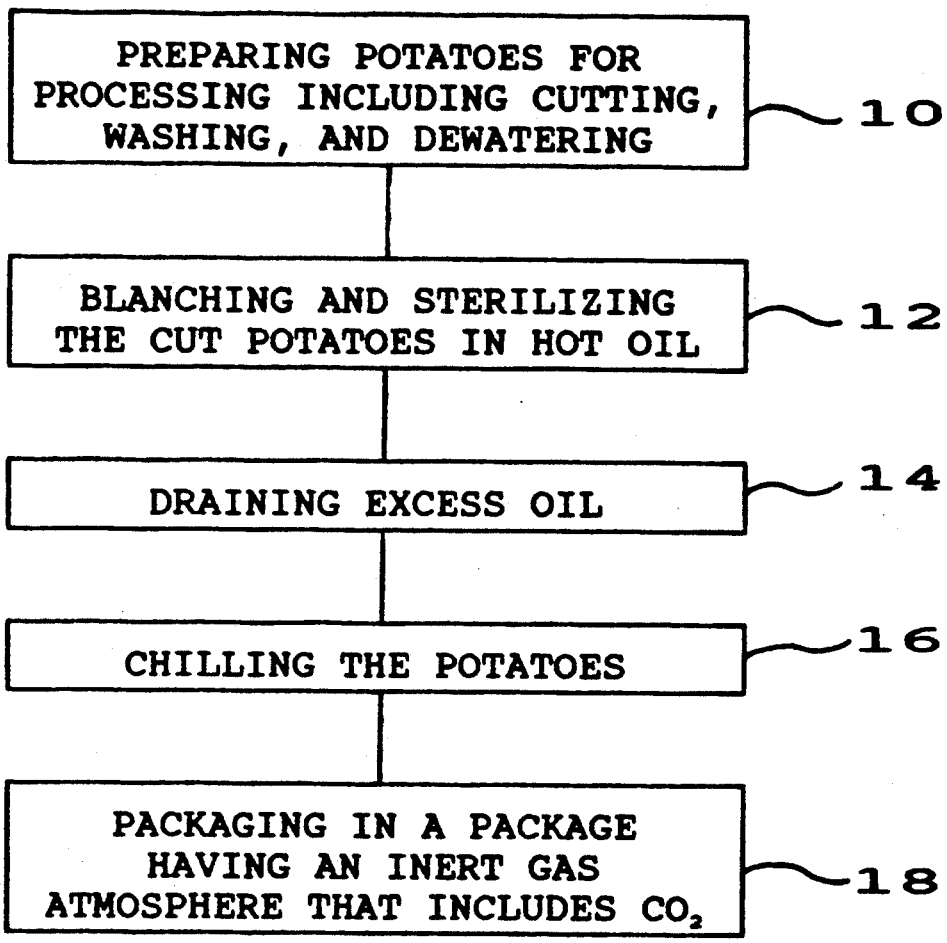
FIG. 1 is a flow diagram of a process for preparing a sliced potato product in accordance with the invention.

Referring now to FIG. 1, a process for preparing sliced potato products in accordance with the present invention is shown. The process broadly stated includes the steps of:
preparing potatoes for processing including cutting, washing, and dewatering, step 10;
blanching and sterilizing the cut potatoes in hot oil, step 12;
draining excess oil, step 14;
chilling the potatoes, step 16; and
packaging the potatoes in a package having an inert gas atmosphere that includes $CO_2$, step 18.

A critical step of the process is step 12 in which blanching and sterilizing of the cut potatoes is accomplished in hot oil. The process parameters of the oil blanch step are closely controlled to insure that the product has to the largest extent possible the texture, color, and solids content of natural potatoes. This is done by oil blanching at a relatively high temperature for a relatively short period of time.

In general, the initial processing step, step 10, is accomplished by techniques that are known in that art. The raw product may be taken as field-run potatoes (unsorted) from freshly harvested or modern storage stocks without special treatment. They are preferably of the Russet variety and, preferably, warmed prior to storage removal. (This is a reasonably normal storage activity that converts sugar-to-starch and helps to control wide changes in color that is a natural process within the tubers.)

Potatoes enter the factory and are washed and may be peeled or, alternately, may remain unpeeled. Trimming and defect removal are achieved by normal factory processes, and the potatoes are cut by the normal methods. As an example, a suitable slicer, such as a model CC Urschel slicer manufactured by Urschel Manufacturing Company, Valparaiso, Indiana, may be used to cut the potatoes into a desired size and shape. Slivers, and short pieces are removed by conventional processes for use in other by-products.

As an example, cold chlorinated water may be used to wash and transport the cut potatoes. Prior to blanching and sterilizing, the cut potatoes must be dewatered by known techniques, such as conveying on an open mesh conveyor. Air drying may also optionally be used to enhance the texture and crispness. The time and conditions of air drying must be closely controlled to prevent moisture loss from the potatoes.

From this point, the normal potato process changes dramatically from prior art processes, i.e. hot water blanching and hot water exposure are completely bypassed. As is known in the art, blanching heats the potato tissue throughout at time and temperature conditions high enough to inactivate the enzymes, which would otherwise cause oxidative darkening of the potato tissue, but not sufficient to soften the tissue enough for normal consumption. Normal blanching conditions range from about 3 to about 6 minutes at water temperatures of about 170° F. to 190° F. (77° C. to 88° C.). As previously explained, a problem with water blanching is that it may adversely affect the texture, solids content, and color of the potato. With the process of the invention, the cut potatoes are subjected to blanching and sterilizing in hot oil, step 12.

The oil blanch time is relatively short to prevent over-processing of the potatoes as previously described. As an example, a conveyor belt transport through an oil bath may be used as a blanching method. The fry or blanch time may be varied depending on potato thickness and the depth of the potatoes on the belt. By way of illustration, the blanch time may be from about 1.5 minutes to about 3 minutes. The oil temperature may be about 360° F. (182° C.) and oil uptake may be targeted at about 5%.

The dwell time between blanching, step 12, and chilling, step 16, is used to drain excess oil. This may also be done by conveying with an open mesh conveyor. Chill time and temperature are also critical parameters of the process but can be achieved by various mechanical refrigeration systems known in the art, i.e. liquid nitrogen or $CO_2$ refrigeration. The exiting product surface temperature is preferably between 28° F. and 32° F. (−2° C. to 0° C.).

After cooling, the cut potatoes are ready for packaging. The product is promptly packed in modified atmosphere packaging, step 18, using suitable equipment.

The package is preferably a semi-rigid container, such as a clear plastic bag. The cut potatoes are placed in the plastic bag and a vacuum is applied to evacuate the package of oxygen. The evacuated vacuum bag is then flushed with an inert gas mixture that preferably contains $CO_2$. The bag is then sealed to prevent leakage of the gas outward and to prevent penetration of air into the package.

Contrary to other prior art processes which utilize modified atmosphere packaging (i.e. U.S. Pat. No. 4,957,761 to Hale), the process of the invention requires the use of carbon dioxide as an inert gas. This is because the solubility of carbon dioxide in surface moisture produces a reduced pH due to the formation of carbonic acid. The carbonic acid has a sterilizing effect by reducing bacteria growth on the potato surfaces. As an example, the inert gas may contain 25% $CO_2$ and 75% $N_2$.

The product may then be packed in cases for distribution. A solids content of the packed processed potato pieces was determined to be about 27.3%. The product is preferably on-site stored at about 30° F. ($-1°$ C.) $\pm 2°$ and shipped at temperatures ranging from about 28° F. ($-2°$ C.) to 32° F. (0° C.). Storage and distribution shelf life is 45 days minimum.

Control samples produced by the process of the invention and held for 45 days showed minimal deterioration and achieved excellent color, odor, and flavor characteristics.

| | |
|---|---|
| coliform | <10 colony forming units/gram |
| standard plate | <3000 colony forming units/gram |
| staphylococci | <50 colony forming units/gram |

These values are lower than required governmental food standards.

Odor in the head space of the packages was that of good, clean oil and cooked potato. After 10 weeks, there was no appearance or odor change.

Refry time at the home or user is recommended at 1.5 to 3 minutes in 350°-360° F. (176° C.-182° C.) oil in relatively small quantities. This is about half the normal fry time of frozen products.

It is apparent from the foregoing that a unique potato preparation and packaging method has been provided. Potatoes processed in accordance with the invention have the color and flavor of fresh cut potatoes and contain no preservatives. While only one presently preferred embodiment has been described in detail, as will be apparent to those familiar with the art, certain changes and modifications can be made without departing from the scope of the invention as defined by the following claims.

What is claimed is:

1. A method of preparing the packaging cut, washed, and dewatered potatoes consisting of the steps of:
    blanching and sterilizing the potatoes in hot oil at about 360° F. for about 1.5 to 3 minutes;
    chilling the potatoes; and then
    packaging the potatoes in a package having an inert gas atmosphere containing $CO_2$ thereby reducing bacterial growth on the potato surfaces by the formation of carbonic acid on the potato surfaces.

2. The method of preparing potatoes as recited in claim 1 and wherein:
    said blanching limits oil uptake to about 5%.

3. The method of preparing potatoes as recited in claim 1 and wherein:
    the chilling is performed to obtain a product surface temperature between about 28° F. and 32° F. ($-2°$ C. to 0° C.).

4. The method of preparing potatoes as recited in claim 1 and wherein:
    the inert gas atmosphere is about 75% $N_2$ and 25% $CO_2$.

5. The method of preparing potatoes as recited in claim 1 and further comprising:
    storing the packaged potatoes at a storing temperature of between about 28° F. ($-2°$ C.) and 32° F. (0° C.).

6. The method of preparing potatoes as recited in claim 1 and wherein:
    the potatoes are trimmed and peeled.

7. The method as recited in claim 1 and wherein:
    the resulting final potato solids content of the packaged potatoes is about 27%.

8. A method for preparing and packaging sliced and washed potatoes consisting of the steps of:
    blanching and sterilizing the potatoes in about 360° F. (182° C.) oil for about 1.5 to 3 minutes;
    draining excess oil;
    chilling the potatoes;
    evacuating a package;
    inserting the potatoes in the package;
    purging the package with a gas mixture of $CO_2$ and $N_2$;
    sealing the package; and then
    storing the package in a cool temperature until ready for cooking.

9. The method of preparing potatoes as recited in claim 8 and wherein:
    chilling is performed to obtain a product surface temperature between 28° F. and 32° F. ($-2°$ C. and 0° C.).

10. The method of preparing potatoes as recited in claim 8 and wherein:
    the gas mixture is about 75% $N_2$ and 25% $CO_2$, thereby reducing bacterial growth on the potato surfaces by the formation of carbonic acid on the potato surfaces.

11. The method of preparing potatoes as recited in claim 8 and wherein:
    the storing temperature is between 28° F. ($-2°$ C.) and 32° F. (0° C.).

12. The method of preparing potatoes as recited in claim 8 and further comprising:
    trimming and peeling the potatoes.

13. The method as recited in claim 8 and wherein:
    the final potato solids content is about 27%.

* * * * *